(12) United States Patent
Jeong et al.

(10) Patent No.: US 9,183,170 B2
(45) Date of Patent: Nov. 10, 2015

(54) ASYNCHRONOUS BRIDGE

(75) Inventors: Bub-Chul Jeong, Yongin-si (KR); Jae Geun Yun, Hwaseong-si (KR); Jae Gon Lee, Yongin-si (KR); Soo Wan Hong, Hwaseong-si (KR)

(73) Assignee: Samsung Electronics Co., Ltd. (KR)

( * ) Notice: Subject to any disclaimer, the term of this patent is extended or adjusted under 35 U.S.C. 154(b) by 450 days.

(21) Appl. No.: 13/617,734

(22) Filed: Sep. 14, 2012

(65) Prior Publication Data

US 2013/0138848 A1    May 30, 2013

(30) Foreign Application Priority Data

Nov. 24, 2011   (KR) .......................... 10-2011-0123872

(51) Int. Cl.
  *G06F 3/00*   (2006.01)
  *G06F 13/40*  (2006.01)

(52) U.S. Cl.
  CPC .................................... *G06F 13/405* (2013.01)

(58) Field of Classification Search
  USPC ............................................. 710/310, 52–57
  See application file for complete search history.

(56) References Cited

U.S. PATENT DOCUMENTS

| | | | | |
|---|---|---|---|---|
| 2,907,004 | A * | 9/1959 | Li Chien Kun et al. | 360/51 |
| 3,836,891 | A * | 9/1974 | McDaniel | 700/159 |
| 4,176,400 | A * | 11/1979 | Heckel | 710/52 |
| 4,463,443 | A * | 7/1984 | Frankel et al. | 710/60 |
| 4,616,338 | A * | 10/1986 | Helen et al. | 710/53 |
| 4,675,865 | A * | 6/1987 | DeVries et al. | 370/463 |
| 4,682,284 | A * | 7/1987 | Schrofer | 710/55 |
| 4,692,893 | A * | 9/1987 | Casper | 710/55 |
| 4,875,206 | A * | 10/1989 | Nichols et al. | 370/427 |
| 5,130,984 | A * | 7/1992 | Cisneros | 370/399 |
| 5,335,326 | A * | 8/1994 | Nguyen et al. | 710/306 |
| 5,699,530 | A * | 12/1997 | Rust et al. | 711/150 |
| 5,787,454 | A * | 7/1998 | Rohlman | 711/5 |
| 6,161,153 | A * | 12/2000 | Porterfield et al. | 710/52 |
| 6,286,072 | B1 * | 9/2001 | Bredin et al. | 710/305 |
| 6,614,441 | B1 * | 9/2003 | Jiang et al. | 345/539 |
| 6,697,927 | B2 * | 2/2004 | Bonola | 711/168 |
| 7,085,874 | B2 | 8/2006 | Penton et al. | |
| 7,437,082 | B1 * | 10/2008 | Smith | 398/175 |
| 7,562,244 | B2 | 7/2009 | Wielage | |
| 7,984,651 | B2 * | 7/2011 | Randall et al. | 73/661 |
| 2002/0188905 | A1 * | 12/2002 | Hollums | 714/752 |

(Continued)

FOREIGN PATENT DOCUMENTS

| | | |
|---|---|---|
| JP | 2006-526206 | 11/2006 |
| KR | 10-2006-0018845 | 3/2006 |
| KR | 10-2008-0062979 | 7/2008 |

OTHER PUBLICATIONS

Exploreroots 4 to 1 mux from 2 to 1 2009.*

*Primary Examiner* — Paul R Myers
(74) *Attorney, Agent, or Firm* — Onello & Mello, LLP

(57) ABSTRACT

An asynchronous bridge includes a transmission unit and a receiving unit. The transmission unit receives a write valid signal and input data from a master circuit, outputs write addresses increment under control of the write valid signal, sequentially stores the input data in memory cells, as directed by write addresses, and then sequentially outputs the stored input data, as directed by read addresses. The receiving unit receives a read ready signal from a slave circuit, determines whether memory cells are valid, based on the write addresses and the read addresses, and then outputs a read valid signal and the input data, based on the determination.

10 Claims, 11 Drawing Sheets

(56) References Cited

U.S. PATENT DOCUMENTS

2006/0274870 A1 12/2006 Wielage
2008/0034161 A1* 2/2008 Savell .......................... 711/118
2008/0256417 A1* 10/2008 Andersson .................... 714/762
2010/0023711 A1* 1/2010 Thyagarajan ................. 711/157
2011/0058422 A1* 3/2011 Warren ..................... 365/185.11

* cited by examiner

ASYNCHRONOUS BRIDGE

CROSS-REFERENCE TO RELATED APPLICATIONS

This application claims the benefit of Korean Patent Application No. 10-2011-0123872, filed on Nov. 24, 2011, in the Korean Intellectual Property Office, the disclosure of which is incorporated herein in its entirety by reference.

BACKGROUND

One or more aspects of the inventive concept relate to an asynchronous bridge, and more particularly, to an asynchronous bridge capable of preventing occurrence of a critical path, a method of operating the asynchronous bridge, and a system on chip (SoC) including the asynchronous bridge.

A SoC is a highly integrated semiconductor technology whereby conventional complicated systems having various functions may be embodied as one system. Research has been actively conducted on development of SoC. in particular, a method of connecting circuits (also referred to herein as "IP") installed in a chip has emerged as a very important issue.

In general, a SoC includes a processor that controls the entire system, and various circuits controlled by the processor. By the term "circuit" we mean, a circuit, a logic unit, or a combination thereof that may be integrated in the SoC. Code may be stored in the circuit or the logic unit, for example.

The circuit may be a central processing unit (CPU); each of cores included in the CPU; a multi-format codec (MFC); a video module, e.g., a camera interface, a Joint Photographic Experts Group (JPEG) processor, a video processor, or a mixer; a three-dimensional (3D) graphic core; an audio system; a driver; a display driver; a volatile memory device; a non-volatile memory; a memory controller; a cache memory, or the like.

The circuit may be classified into a slave circuit that is operated only under control of a processor, and a master circuit that may request another slave circuit to establish data communication. in some cases, one circuit may act as both a slave circuit and a master circuit, for example.

Since circuits have different clock frequencies, various clock domains may be used in one SoC. In this case, data should be exchanged between the circuits having different clock domains.

SUMMARY

In exemplary embodiments in accordance with principles of inventive concepts, an asynchronous bridge includes a transmission unit and a receiving unit. The transmission unit receives a write valid signal and input data from a master circuit, outputs write addresses incremented under control of the write valid signal, sequentially stores the input data in memory cells, as directed by write addresses, and then sequentially outputs the stored input data, as directed by read addresses. The receiving unit receives a read ready signal from a slave circuit, determines whether memory cells are valid, based on the write addresses and the read addresses, and then outputs a read valid signal and the input data, based on the determination.

In exemplary embodiments in accordance with principles of inventive concepts, the transmission unit may include a write address controller that increments write addresses, in response to the write valid signal received from the master circuit, and outputs incremented write addresses; a first selector selectively outputs the input data, based on the output write addresses; at least two memory groups each including memory cells from among the memory cells, the at least two memory groups sequentially stores the input data received from the first selector in the memory cells; and at least two selectors selectively outputs the stored input data, based on the read addresses, the at least two selectors corresponding to the at least two memory groups, respectively.

In exemplary embodiments in accordance with principles of inventive concepts, a receiving unit may include a global read address controller increments global read addresses to select one of the at least two memory groups, responsive to the read ready signal received from the slave circuit and the read valid signal, and sequentially outputs incremented global read addresses; a determination unit compares the write addresses with the global read addresses, determines whether the at least two memory groups are valid, based on a result of the comparison, and then outputs a result of the determination; and a local read address controller outputs local read addresses to sequentially select memory cells included in the selected memory group, based on a read ready signal corresponding to the selected memory group and the result of determining whether the at least two memory groups are valid.

In exemplary embodiments in accordance with principles of inventive concepts, if the determining of whether the at least two memory groups reveals that at least one memory group is valid from among the at least two memory groups, then the determination unit may simultaneously output a read valid signal indicating this fact and output data stored in memory cells corresponding to the at least one memory group to the slave circuit and the global read address controller. If the determining of whether the at least two memory groups reveals that that all the at least two memory groups are invalid, then the determination unit may output a read valid signal indicating this fact to the slave circuit and the global read address controller.

In exemplary embodiments in accordance with principles of inventive concepts, the determination unit may include a determination logic unit for determining whether data stored in memory cells included in a memory group corresponding to the write addresses and the global read addresses, based on the write addresses and the global read addresses, and outputting a result of the determining; and a latch unit for latching an output signal of the determination logic unit and outputting the latched signal as the read valid signal.

The latch unit may include at least one flip-flop. If a number of the at least two memory groups is k, a number of the at least one flip-flop may be (k−1), wherein k denotes an integer that is equal to or greater than '2'.

In exemplary embodiments in accordance with principles of inventive concepts, the local read address controller may include an arithmetic logic unit for comparing each of read ready signals respectively corresponding to the at least two memory groups with the read valid signal, and outputting a result of the comparing; and a first flip-flop for outputting an input value for only a predetermined output value received from the arithmetic logic unit.

In exemplary embodiments in accordance with principles of inventive concepts, a method of operating an asynchronous bridge includes at least two memory groups, the method including receiving a write valid signal and input data from a master circuit; outputting write addresses incremented in response to the write valid signal, and sequentially storing the input data in memory cells included in the at least two memory groups, based on the write addresses; and determining whether the at least two memory groups are valid, based on the write addresses and global read addresses.

In exemplary embodiments in accordance with principles of inventive concepts, a computer readable recording medium has recorded thereon a computer program for performing the method.

In exemplary embodiments in accordance with principles of inventive concepts, system on chip (SoC) includes a master circuit, a slave circuit, and the above-described asynchronous bridge.

In exemplary embodiments in accordance with principles of inventive concepts, an electronic circuit includes a transmitting circuit to receive data from a master circuit and store the data interleaved in a plurality of memory groups and a receiving circuit to read data from the memory groups in a pipelined process and transmit the data to a slave circuit, wherein the master and slave circuits are configured to operate asynchronously.

In exemplary embodiments in accordance with principles of inventive concepts, master circuit, slave circuit, transmitting circuit, and receiving circuit are implemented as components of a system on a chip (SoC).

In exemplary embodiments in accordance with principles of inventive concepts, such a circuit is configured to provide a system bus interface.

In exemplary embodiments in accordance with principles of inventive concepts, such a circuit further includes a radio transceiver.

In exemplary embodiments in accordance with principles of inventive concepts, such a circuit is configured as a tablet PC.

In exemplary embodiments in accordance with principles of inventive concepts, such a circuit is configured as a e-reader.

BRIEF DESCRIPTION OF THE DRAWINGS

Exemplary embodiments of the inventive concept will be more clearly understood from the following detailed description taken in conjunction with the accompanying drawings in which.

DESCRIPTION

Figure 1:
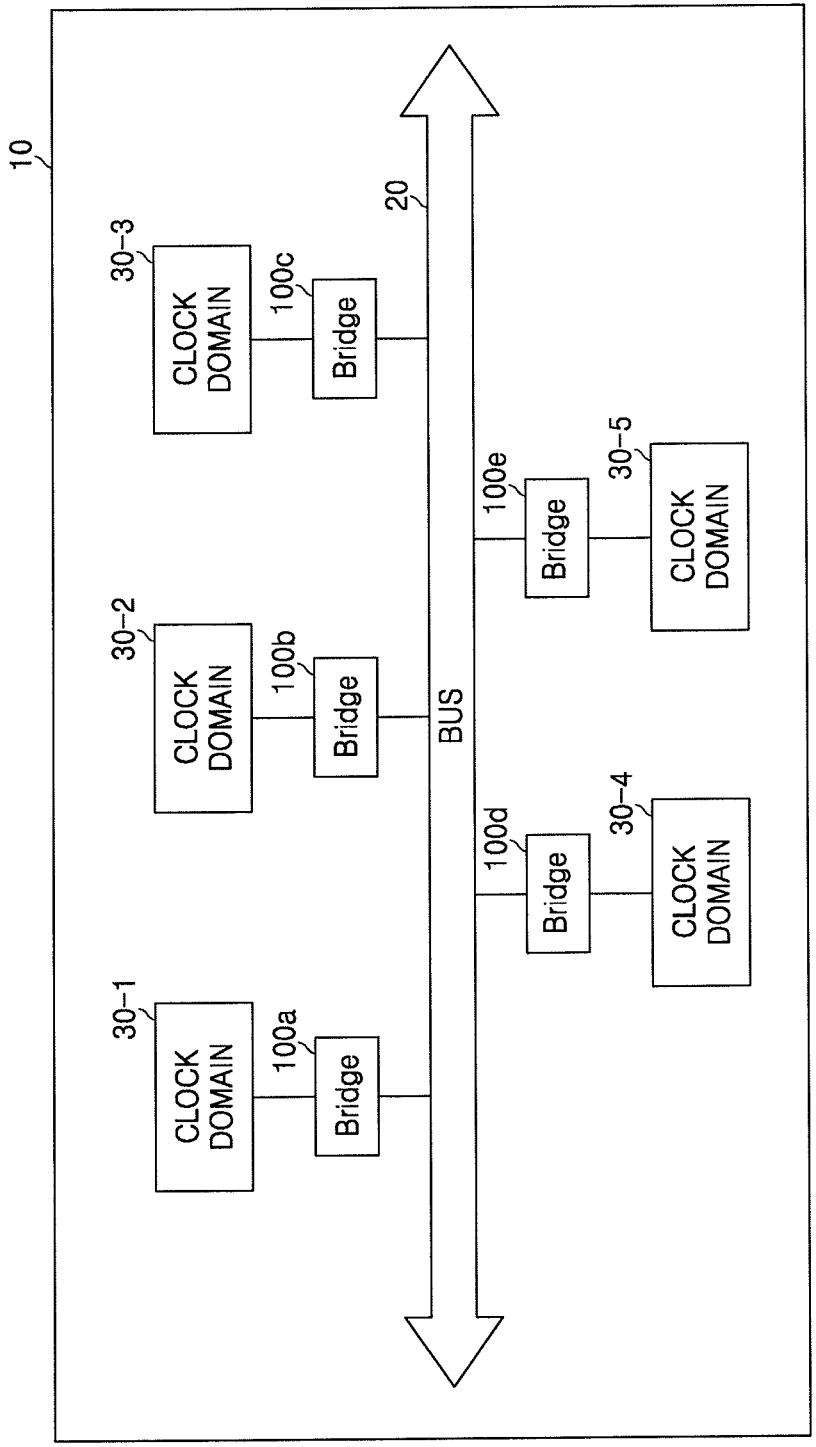
FIG. 1 is a block diagram of a system on chip (SoC) in accordance with principles of inventive concepts.

Exemplary embodiments in accordance with principles of inventive concepts will now be described more fully with reference to the accompanying drawings, in which exemplary embodiments are shown. Exemplary embodiments in accordance with principles of inventive concepts may, however, be embodied in many different forms and should not be construed as being limited to the embodiments set forth herein; rather, these embodiments are provided so that this disclosure will be thorough and complete, and will fully convey the concept of exemplary embodiments to those of ordinary skill in the art. In the drawings, the thicknesses of layers and regions may be exaggerated for clarity. Like reference numerals in the drawings denote like elements, and thus their description may not be repeated.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Like numbers indicate like elements throughout. As used herein the term "and/or" includes any and all combinations of one or more of the associated listed items. Other words used to describe the relationship between elements or layers should be interpreted in a like fashion (e.g., "between" versus "directly between," "adjacent" versus "directly adjacent," "on" versus "directly on").

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of exemplary embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of exemplary embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof.

Exemplary embodiments in accordance with principles of inventive concepts are described herein with reference to cross-sectional illustrations that are schematic illustrations of idealized embodiments (and intermediate structures) of exemplary embodiments. As such, variations from the shapes of the illustrations as a result, for example, of manufacturing techniques and/or tolerances, are to be expected. Thus, exemplary embodiments in accordance with principles of inventive concepts should not be construed as limited to the particular shapes of regions illustrated herein but are to include deviations in shapes that result, for example, from manufacturing. For example, an implanted region illustrated as a rectangle may have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of exemplary embodiments.

Unless otherwise defined, all terms (including technical and scientific terms) used herein have the same meaning as commonly understood by one of ordinary skill in the art to which exemplary embodiments in accordance with principles of inventive concepts belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

FIG. 1 is a block diagram of an exemplary embodiment of a system on chip (SoC) 10 that includes an asynchronous bridge in accordance with principles of inventive concepts. SoC 10 includes a system bus 20, clock domains 30-1, 30-2, 30-3, 30-4, and 30-5, and asynchronous bridges 100a, 100b, 100c, 100d, and 100e. SoC 10 may be manufactured as a single chip and embodied as one package, for example. Although, for convenience of explanation, FIG. 1 SoC 10 includes five clock domains and five asynchronous bridges, inventive concepts are not limited thereto.

System bus 20 provides a channel between the components of SoC 10. Clock domains 30-1, 30-2, 30-3, 30-4, and 30-5 are regions in which different operating frequencies are used, and each includes at least one circuit. That is, at least one circuit included in one of clock domains 30-1, 30-2, 30-3, 30-4, and 30-5 operates according to the same operating frequency.

Asynchronous bridges 100a, 100b, 100c, 100d, and 100e are connection means with which clock domains 30-1, 30-2, 30-3, 30-4, and 30-5, using different operating frequencies, may exchange data with one another.

SoC 10 may be embodied as an integrated circuit and may be installed in a mobile telecommunication apparatus, such as a mobile phone, a smart phone, a tablet personal computer (PC), or a personal digital assistant (PDA), for example. In accordance with principles of inventive concepts, SoC 10 may be installed in an information technology (IT) device or a portable electronic device, for example.

Figure 2:
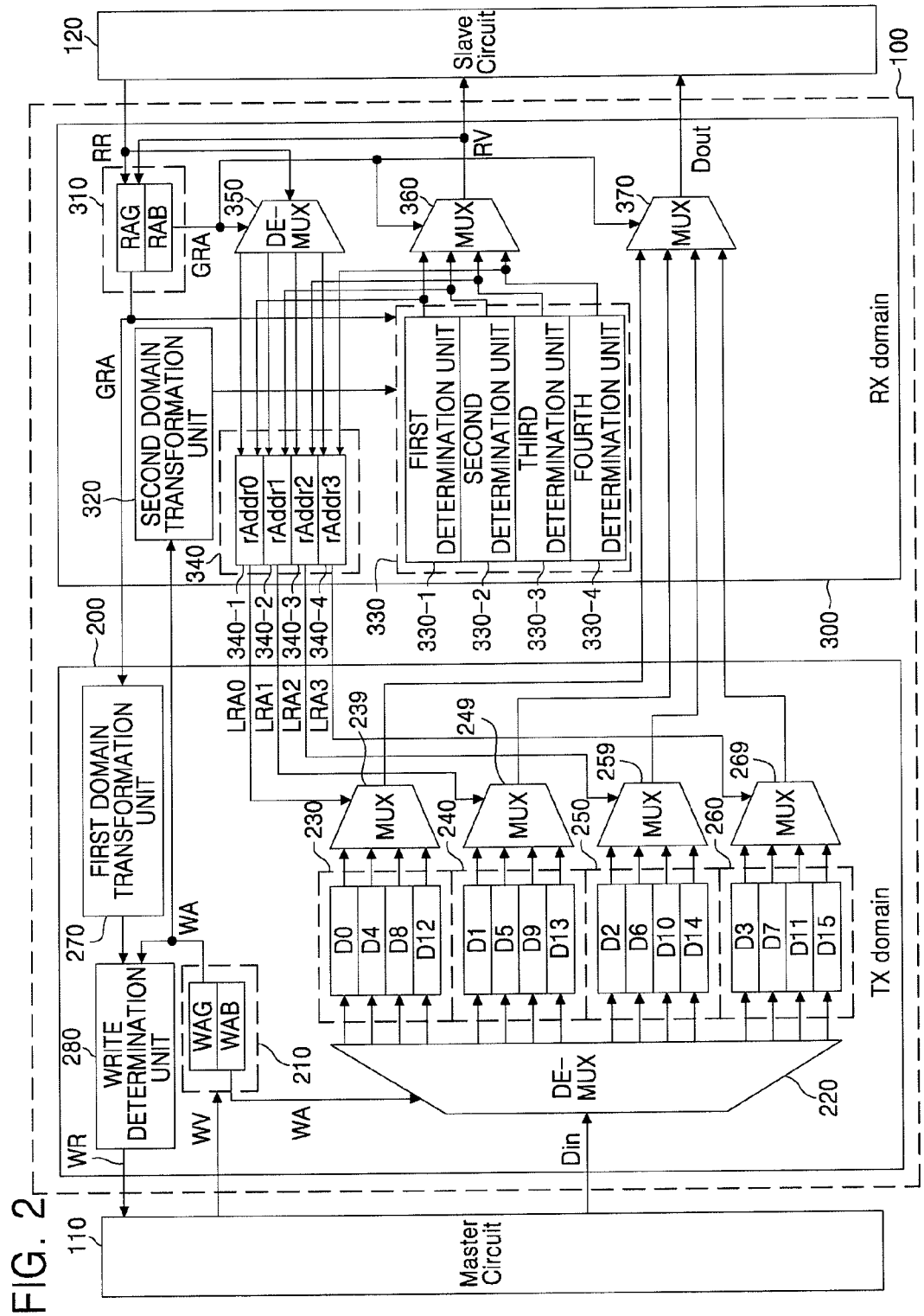
FIG. 2 is a schematic circuit diagram of an asynchronous bridge, such as that illustrated in FIG. 1, in accordance with principles of inventive concepts.

FIG. 2 is a schematic circuit diagram of an exemplary embodiment of an asynchronous bridge 100 in accordance with principles of inventive concepts, such as those illustrated in FIG. 1. Asynchronous bridge 100 includes transmission unit 200 and receiving unit 300 to allow exchange of data between master circuit 110 and slave circuit 120. Transmission unit 200 and receiving unit 300 may be circuit blocks operating according to different clock signals.

Transmission unit 200 includes write address controller 210, first selector 220, first to fourth memory groups 230 to 260, second to fifth selectors 239, 249, 259, and 269, first domain transformation unit 270, and write determination unit 280. Receiving unit 300 includes global read address controller 310, second domain transformation unit 320, determination unit 330, local read address controller 340, and sixth to eighth selectors 350 to 370.

In an exemplary embodiment in accordance with principles of inventive concepts, first selector 220, second to fifth selectors 239, 249, 259, and 269, and sixth to eighth selectors 350 to 370 are embodied as multiplexers and demultiplexers, but the inventive concept is not limited thereto.

In operation, master circuit 110 transmits a write valid signal WV and input data Din corresponding to, or, associated with, write valid signal WV to write address controller 210 and first selector 220, respectively.

Write address controller 210 counts write addresses corresponding to first to fourth memory groups 230 to 260, based on write valid signal WV received from master circuit 110, and outputs write addresses WA corresponding to a result of a counting operation. That is, write address controller 210 increments write addresses in response to the assertion of write valid signal WV by master circuit 110. As will be described in greater detail in discussions related to the following figures, in an exemplary, binary code, embodiment in accordance with principles of inventive concepts, memory locations are interleaved throughout memory groups 230 to 260, allowing data stored in sequential memory addresses to be read out rapidly in pipeline-fashion, with read operations on sequential locations overlapping in time. As a result, while controller 210 increments write addresses sequentially in response to reception of write valid signal WV (0000, 0001, 0010, . . . 1111), a first block of data D0 (128 bits in an exemplary embodiment) is written to a first memory location in first memory group 230 (address 0000), a second block of data D1 is written to a first memory location in second memory group 240 (address 0001), a third block of data D2 is written to a first memory location in third memory group 250 (address 0010), . . . , a sixth block of data D5 is written into a second memory location in a second memory group 240 (address 0101), a ninth block of data D8 is written into a third memory location in a first memory group 230 (address 1000) and so on, until a sixteenth block of data D15 is written into a fourth memory location in a fourth memory group 260 (address 1111). In such an exemplary binary-code address controller 210 embodiment, the two least significant bits of the address may be employed as global read addresses, employed by global read address controller 310 to cycle through memory groups 230 to 260 and the two most significant bits of the address may be employed as local read addresses, used to cycle through individual memory locations within each memory group.

In an exemplary embodiment in accordance with principles of inventive concepts, write address controller 210 receives write valid signal WV and generates a gray code or binary code for controlling first selector 220. Write address controller 210 may include a code transformation unit (not shown) to transform a gray code into a binary code or a binary code into a gray code, for example.

First selector 220 selectively outputs input data Din associated with write valid signal WV to first to fourth memory groups 230 to 260, based on write addresses WA received from write address controller 210.

First to fourth memory groups 230 to 260 include memory cells D0 to D15, and sequentially store data Din received from first selector 220 in memory cells D0 to D15. For example, in first to fourth memory groups 230 to 260, data Din may be sequentially stored in memory cells D0 to D15. In such an exemplary embodiment, each of memory cells D0 to D15 may be embodied as 128 flip-flops to transmit and receive 128-bit data, for example.

Second to fifth selectors 239, 249, 259, and 269 correspond to first to fourth memory groups 230 to 260, respectively, and selectively output data stored in memory cells D0 to D15 included in first to fourth memory groups 230 to 260, based on local read addresses LRA0 to LRA3.

In an exemplary embodiment in accordance with principles of inventive concepts, an implementation in which transmission unit 200 includes four memory groups 230 to 260 has been described above to describe asynchronous bridge 100 implemented as a 4-cycle multi-path, but the inventive concept is not limited thereto. For example, transmission unit 200 may include k memory groups so as to realize a k-cycle multi-path according to a data transmission path, where, 'k' denotes an integer that is equal to or greater than '2'.

First domain transformation unit 270 stabilizes signals to be transmitted between domains having different operating frequencies. First domain transformation unit 270 may stabilize a signal received from receiving unit 300 to be a signal corresponding to transmission unit 200. To this end, first domain transformation unit 270 may be embodied as at least one flip-flop, operating at a frequency based on an operating frequency of transmission unit 200.

In an exemplary embodiment in accordance with principles of inventive concepts, write determination unit 280 may determine whether data is to be written to memory cells D0 to D15, based on write addresses WA received from write address controller 210 and global read addresses GRA, and then output a write ready signal WR corresponding to a result of the determination to master circuit 110.

Then, master circuit 110 may determine whether data is to be stored in memory cells D0 to D15, based on write ready signal WR received from write determination unit 280, and, if so, transmit data to memory cells D0 to D15.

Receiving unit 300 will now be described in greater detail. Global read address controller 310 counts, that is, increments and outputs, global read addresses GRA to select a memory group from among first to fourth memory groups 230 to 260, based on a read ready signal RR received from slave circuit 120 and a read valid signal RV. Global read address controller 310 is incremented, that is, increased the address by one, only when both signal RR and RV are high.

In this exemplary embodiment in accordance with principles of inventive concepts, global read address controller 310 receives read ready signal RR and generates a gray code or a binary code for controlling sixth selector 350, thereby providing "ready" signals (ready0 through ready3) to respective selected receiving units 300-1 through 300-4. Global read address controller 310 may include a code transformation unit (not shown) to transform a binary code into a gray code or a gray code into a binary code, for example.

Second domain transformation unit 320 stabilizes a signal received from write address controller 210 of transmission unit 200, which is in a domain having a different operating frequency. Second domain transformation unit 320 may be embodied as at least one flip-flop operating at a frequency based on an operating frequency of receiving unit 300.

Determination unit 330 compares write addresses WA to global read addresses GRA to determine whether first to fourth memory groups 230 to 260 are valid and outputs the determination. Write addresses WA are received from write address controller 210 via second domain transformation unit 320. Determination unit 330 may include first to fourth determination units 330-1 to 330-4 that respectively correspond to first to fourth memory groups 230 to 260.

Local read address controller 340 includes first local read address controller (rAddr0) 340-1 to fourth local read address controller (rAddr3) 340-4, used to control access to data within each of first to fourth memory groups 230 to 260, respectively. Local read address controller 340 outputs local read addresses LRA0 to LRA3 to sequentially select memory cells within each of first to fourth memory groups 230 to 260, based on read ready signal RR and read valid signal RV.

In an exemplary embodiment in accordance with principles of inventive concepts, first to fourth local read address controllers 340-1 to 340-4 output local read addresses LRA0 to LRA3 as enable signals for controlling second to fifth selectors 239, 249, 259, and 269, respectively.

Sixth selector 350 selectively outputs read ready signal RR received from slave circuit 120 to first to fourth local read address controllers 340-1 to 340-4, based on global read addresses GRA.

Seventh selector 360 selectively outputs read valid signal RV received from first to fourth determination units 330-1 to 330-4 to slave circuit 120 and global read address controller 310, based on global read addresses GRA.

Eighth selector 370 selectively outputs data received from second to fifth selectors 239, 249, 259, and 269 to slave circuit 120, based on global read addresses GRA.

Figure 3:
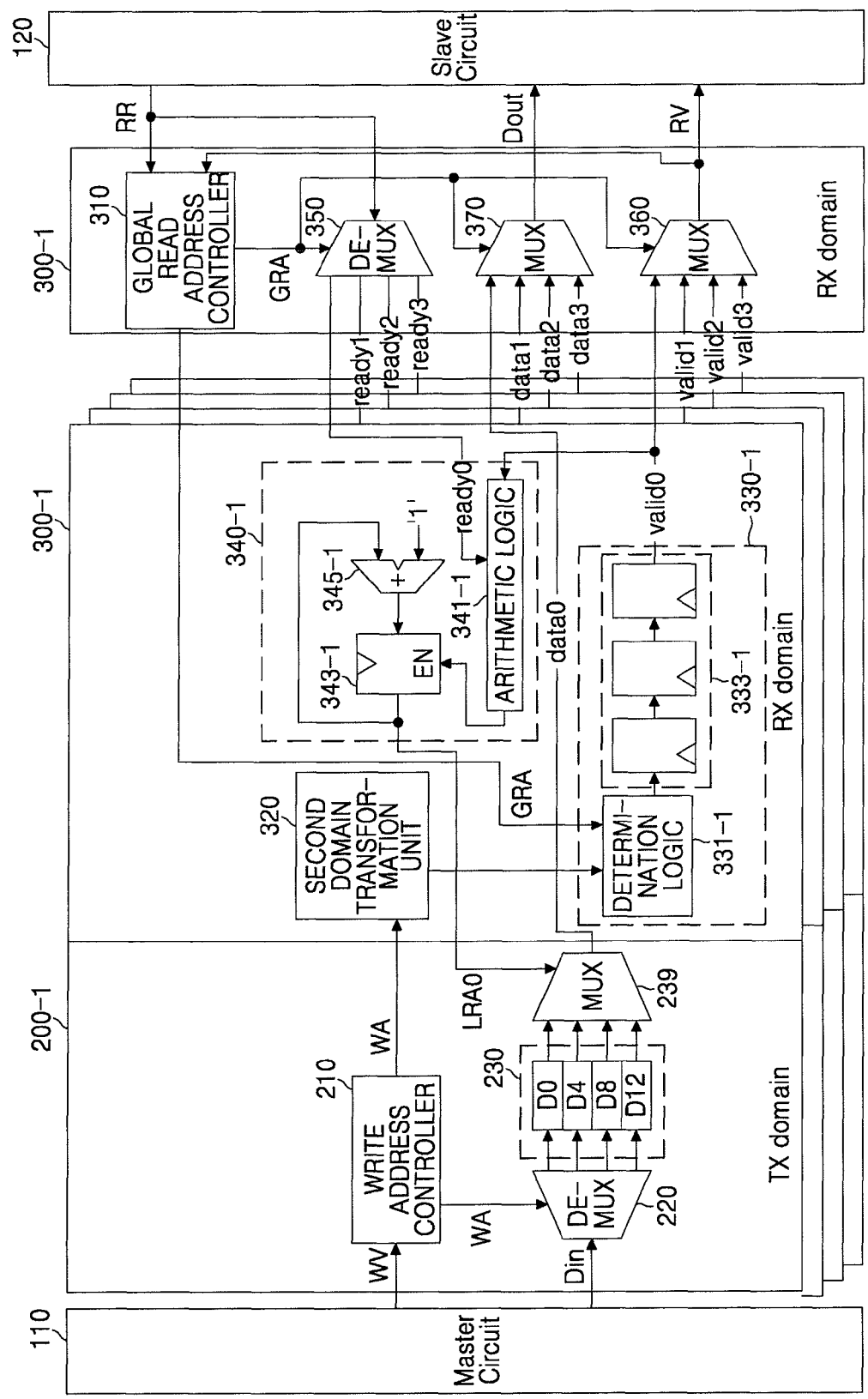
FIG. 3 is a detailed circuit diagram of the asynchronous bridge of FIG. 2.

FIG. 3 is a circuit diagram of an exemplary embodiment of asynchronous bridge 100 of FIG. 2. For convenience of explanation, FIG. 3 illustrates only first memory group 230 from among first to fourth memory groups 230 to 260.

Referring to FIGS. 1 to 3, in an exemplary embodiment in accordance with principles of inventive concepts, master circuit 110 transmits write valid signal WV and input data Din to write address controller 210 and first selector 220, respectively. Write address controller 210 increments write addresses WA corresponding to memory cells D0, D4, D8, and D12 included in first memory group 230, based on write valid signal WV.

First selector 220 selectively outputs input data Din, based on write addresses WA, and first memory group 230 stores input data Din received from first selector 220 in memory cells corresponding to write addresses WA.

Global read address controller 310 increments and sequentially outputs global read addresses GRA for selecting a memory group from among first to fourth memory groups 230 to 260, based on a read ready signal RR received from slave circuit 120 and read valid signal RV.

First determination unit 330-1 includes determination logic unit 331-1 and latch unit 333-1. Determination logic unit 331-1 determines whether first memory group 230 is valid, based on write addresses WA and global read addresses GRA, and outputs a result of the determination.

Figure 4:
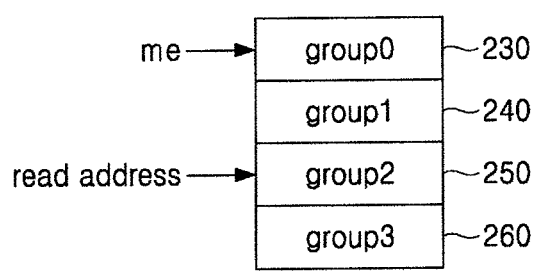
FIG. 4 is a diagram for explaining an operation of a determination logic unit of FIG. 3, in accordance with principles of inventive concepts.

An exemplary embodiment in accordance with principles of inventive concepts of a method of determining whether a memory group is valid, performed by determination logic unit 331-1, is described in the discussion related to FIG. 4.

FIG. 4 is a diagram that will be used to discuss an exemplary embodiment of an operation of determination logic unit 331-1 of FIG. 3, in accordance with principles of inventive concepts. FIG. 4 focuses on operation of determination logic unit 331-1 corresponding to first memory group 230 illustrated in FIGS. 2 and 3. In FIG. 4, 'me' denotes a process corresponding to first memory group 230, and 'read address' denotes a current global read address GRA at which global read address controller 310 is to read data.

Determination logic unit 331-1 may determine whether first memory group 230 is valid, based on the following equations:

$$(\text{address of first memory group}) + \sim(\text{current global read address}) + 1 \quad (1)$$

$$(\text{write address}) + \sim(\text{read address}) + 1 \quad (2)$$

Expression (1) is an expression of an exemplary method of calculating the absolute distance from the memory group corresponding to the current global read address to the determination logic unit's memory group. Expression (2) is an expression of an exemplary method of calculating a number of available memory cells that could be read from among memory cells included in first to fourth memory groups 230 to 260. Expression (1) may be calculated by using a 2-bit write address and a 2-bit read address, because in an exemplary embodiment, there are only 4 memory groups.

If, for example, receiving unit 300 is reading cell D6, and the data is available in D7~D9, and it has to be determined whether first memory group 230 is valid or not. The expression (1) is applied to calculate the needed memory cell count. If Expression (1) is applied to the process of FIG. 4, then an address '00' of first memory group 230 and a negation value '01' of a current global read address (GRA) '10' are added together to obtain '01' and '01' is added to the result of addition '01' to obtain '10'. The result means more than 2 available memory cells are needed for first memory group 230 to be available. That is, in order to determine whether first memory group 230 is valid, data of third memory group 250, data of fourth memory group 260, and data of first memory group 230 are sequentially employed.

In order to calculate a number of memory cells that is available from memory cells included in first to fourth memory groups 230 to 260, Equation (2) is applied, from the above assumption, data is read from a memory cell D6 (read address, third memory group 250) and a memory cell is written up to D9 (write address, second memory group 240), then '1001' and a negation value '1001' of '0110' are added together to obtain '0010' and '0001' is added to '0010' to obtain '0011'. This means that there are three memory cells.

Thus, if a value obtained using Equation (2) is greater than a value obtained using Expression (1), then first memory group 230 may be determined to be valid. In other words, it may be determined that readable data is stored in first memory group 230.

That is, respective determination logic units 331-1 through 331-4 may determine whether their respective memory groups contain readable data by: 1) calculating the current global read address and the determination logic unit's memory group address and 2) subtracting the read address from the write address. The first operation indicates which of the memory groups 230 through 260 is currently being accessed by receiving unit 300. That access is directed by global read address GRA, which directs demultiplexer 350 to activate a ready signal (ready0, ready1, etc) to the arithmetic logic unit 341-1 through 341-4 associated with the memory group currently being read from and to accept data (data0, data1, etc.) and valid indicators (valid0, valid1, etc.) respectively, through multiplexors 370, 360. As previously indicated, global read address GRA may be the least significant two bits of a binary coded address embodiment, for example. The second operation indicates the number of memory cell locations between the current write address WA and the current read address (a combination of global read address GRA and local read address (LRA0, LRA1, etc.)). Valid data will only be available for reading after it is written to a memory cell; read operations "follow" write operations, cycling through memory cell locations after data is written to the memory cells. These address subtractions indicate how far "ahead" of read operations write operations are and, correspondingly, which memory groups have valid data available.

Referring back to FIG. 3, determination logic unit 331-1 may output a read valid signal valid0 indicating whether first memory group 230 is valid or invalid, the indication depending on the state of read valid signal valid0. Such an indication may be a logic "1" if the memory group is valid and logic "0" if the memory group is not valid, for example.

Latch unit 333-1 latches an output signal of determination logic unit 331-1 and then outputs the latched signal to an arithmetic logic unit 341-1 and seventh selector 360. Latch unit 333-1 may be embodied as at least one flip-flop that may be kept enabled without having to input an additional enable signal thereto.

In an asynchronous bridge 100 that is a 4-cycle multi-path in accordance with principles of inventive concepts, latch unit 333-1 may include three flip-flops so that read valid signal valid0 may be output after data transmitted from first memory group 230 may be stabilized for three cycles. In other words, if k memory groups are included in asynchronous bridge 100, latch unit 333-1 may include (k−1) flip-flops. Here, 'k' denotes an integer that is equal to or greater than '2'.

First local read address controller 340-1 includes arithmetic logic unit 341-1, flip-flop 343-1, and adder 345-1.

Arithmetic logic unit 341-1 performs an operation on a first read ready signal ready0 and first read valid signal valid0 and outputs the result. Arithmetic logic unit 341-1 may be embodied as an AND gate, for example.

Flip-flop 343-1 is enabled only when a value output from arithmetic logic unit 341-1 is '1'. Adder 345-1 adds '1' to a value of a previous signal output from flip-flop 343-1, and then outputs the result to flip-flop 343-1. Flip-flop 343-1 and adder 345-1 may function as counters. '1' may be added to the value of the previous signal output from flip-flop 343-1 only when flip-flop 343-1 is enabled.

If determination logic unit 331-1 determines that first memory group 230 is valid, flip-flop 343-1 is enabled, and second selector 239 selectively outputs data stored in memory cells D0, D4, D8, and D12, as directed by local read address LRA0 received from flip-flop 343-1.

Figure 5:
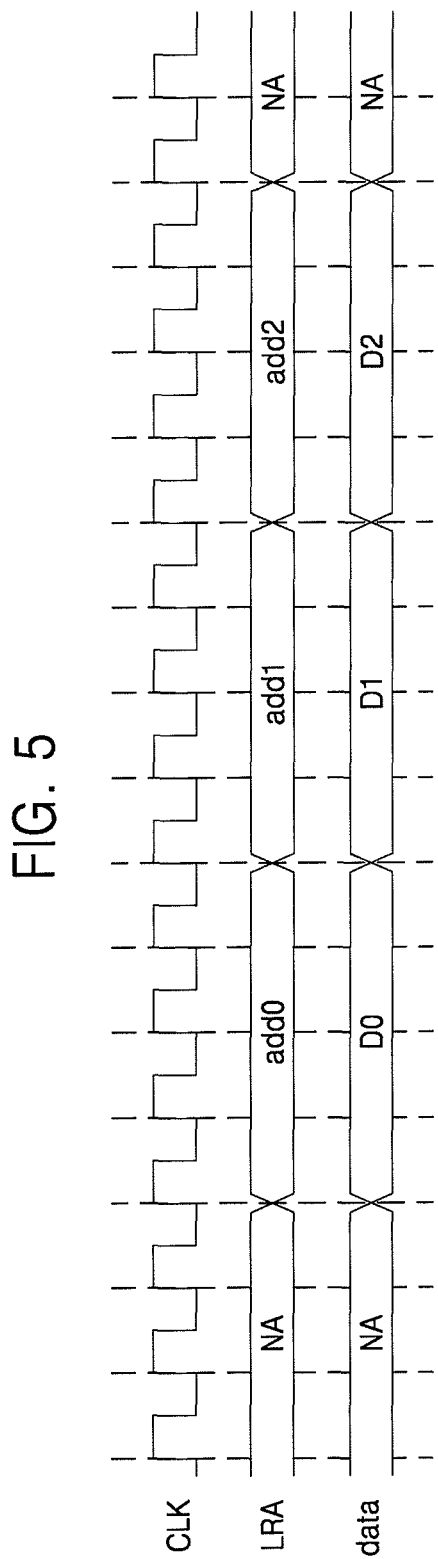
FIG. 5 is a timing diagram for explaining a method of transmitting and receiving data, performed by an asynchronous bridge, according to a comparative example of the inventive concept.
Figure 6:
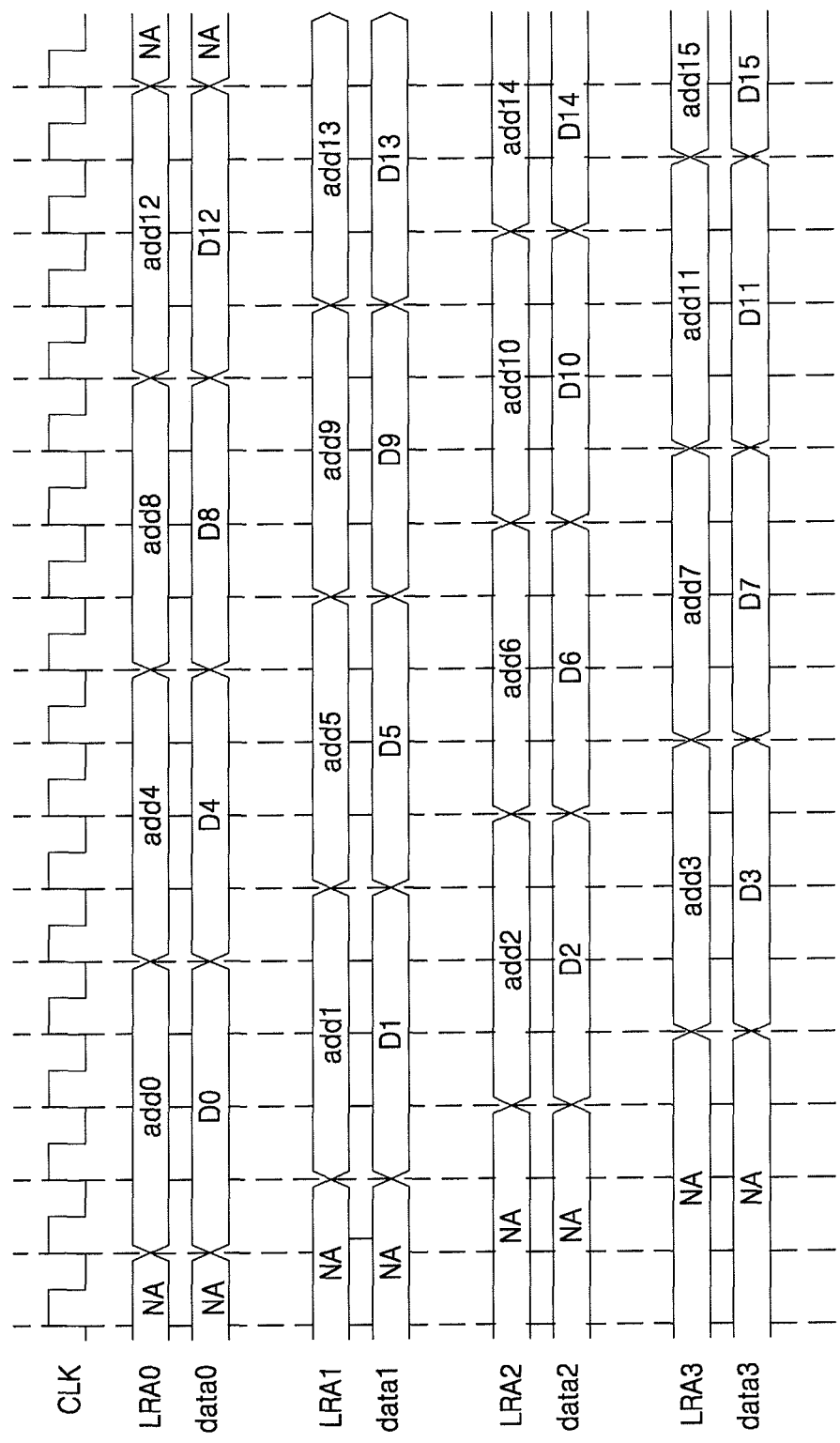
FIG. 6 is a timing diagram for explaining a method of transmitting and receiving data, performed by an asynchronous bridge, in accordance with principles of inventive concepts.

FIG. 5 is a timing diagram for explaining an exemplary embodiment of a method of transmitting and receiving data, performed by an asynchronous bridge, according to a comparative example of the inventive concept. FIG. 6 is a timing diagram for explaining a method of transmitting and receiving data, performed by an asynchronous bridge, in accordance with principles of inventive concepts.

Referring to FIG. 5, when a data stored in a memory cells D0 to D15 that are not divided into groups are output to slave circuit 120 of FIG. 3, data are sequentially output from memory cells D0 to D15. Thus, bobbles may be generated between pieces of data, thereby causing a delay in transmission of all data from memory cells D0 to D15.

However, referring to FIG. 6, in accordance with principles of inventive concepts, memory cells D0 to D15 may be divided into memory groups, and the memory groups or memory cells corresponding thereto may be interleaved and accessed in a pipelined manner. Thus, units of data data0 to data3 stored in a memory cells D0 to D15 may be selectively output. Accordingly, units of data data0 to data3 may be sequentially output without causing bobbles to be generated between units of data data0 to data3 or causing a delay in transmission of units of data data0 to data3.

Figure 7:
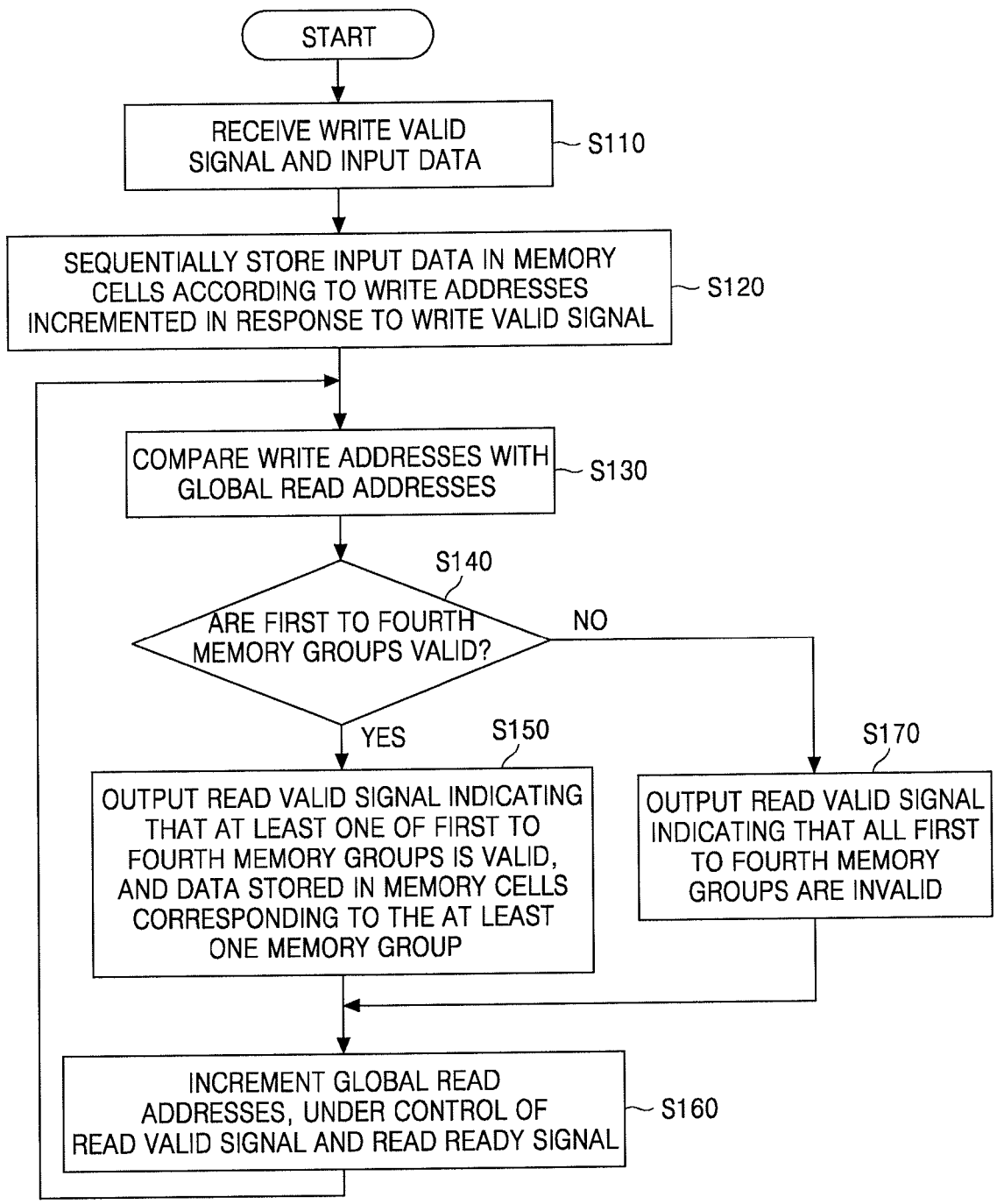
FIG. 7 is a timing diagram of a method of operating an asynchronous bridge, in accordance with principles of inventive concepts.

FIG. 7 is a flow diagram of an exemplary embodiment of a method of operating an asynchronous bridge, in accordance with principles of inventive concepts. Although FIG. 7 illustrates a case where data is continuously input to asynchronous bridge 100 of FIG. 2 from master circuit 110 of FIG. 2, the inventive concept is not limited thereto.

Referring to FIGS. 1 to 7, asynchronous bridge 100 receives a write valid signal WV and input data Din from master circuit 110 (operation S110).

Write address controller 210 outputs write addresses WA incremented in response to write valid signal WV, and first to fourth memory groups 230 to 260 sequentially store input data Din received from first selector 220 in memory cells D0 to D15, based on write addresses WA (operation S120).

Determination unit 330 compares write addresses WA with global read addresses GRA (operation S130).

Determination unit 330 determines whether first to fourth memory groups 230 to 260 are valid for a read operation, based on a result of the comparing (operation S140). If it is determined that at least one memory group from among first to fourth memory groups 230 to 260 is valid, then a read valid signal RV indicating this fact and data Dout stored in memory cells corresponding to the at least one memory group are output to slave circuit 120 and global read address controller 310 (operation S150).

Global read address controller 310 increments global read addresses GRA, under control of read valid signal RV and a read ready signal RR received from slave circuit 120 (operation S160).

However, if it is determined in operation S140 that none of memory groups 230 to 260 is valid (that is, includes valid data), determination unit 330 outputs a read valid signal RV indicating this fact to slave circuit 120 and global read address controller 310 (operation S170). Global read address controller 310 increments global read address GRA, under control of read valid signal RV and read ready signal RR received from slave circuit 120 (operation S160).

In accordance with principles of inventive concepts, when data is continuously input from master circuit 110, data is sequentially stored in first to fourth memory groups 230 to 260, and determination unit 330 repeatedly performs operations S130 to S160.

Figure 8:
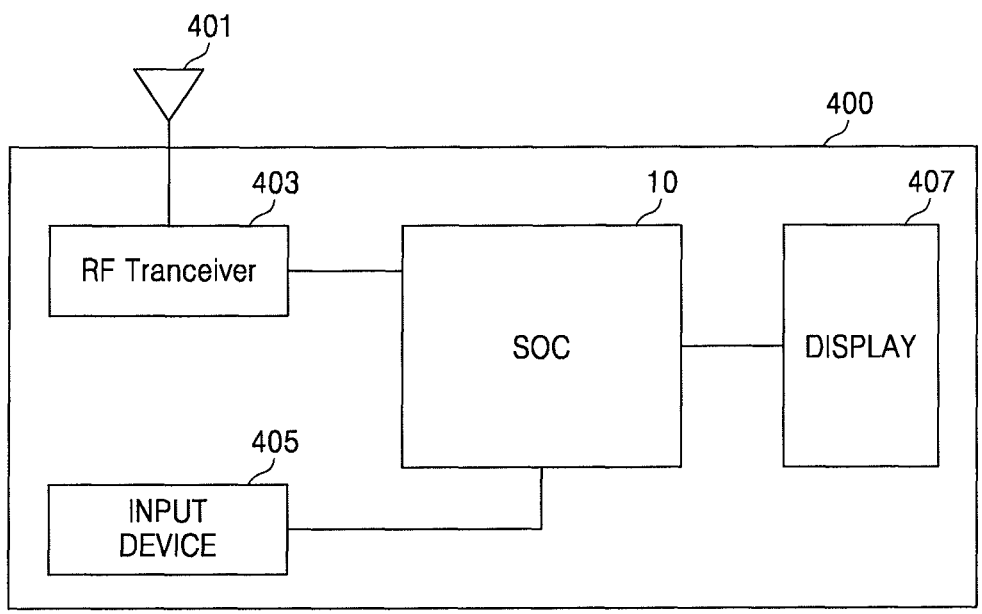
FIG. 8 is a block diagram of a semiconductor system including the SoC illustrated in FIG. 1 in accordance with principles of inventive concepts.

FIG. 8 is a block diagram of an exemplary embodiment of a semiconductor system including the SoC illustrated in FIG. 1 according to exemplary embodiments in accordance with principles of inventive concepts.

Referring to FIG. 8, semiconductor system 400 includes SoC 10 illustrated in FIG. 1, antenna 401, radio transceiver 403, input device 405 and display 407.

Radio transceiver 403 transmits or receives radio signals through antenna 401. Radio transceiver 403 may convert radio signals received through antenna 401 into signals that can be processed by SoC 10. Accordingly, SoC 10 may process signals output from radio transceiver 403 and transmit the processed signals to display 407. Radio transceiver 403 may also convert signals output from SoC 10 into radio signals and output the radio signals to an external device through antenna 401, for example.

Input device 405 enables control signals for controlling the operation of SoC 10 or data to be processed by SoC 10 to be input to semiconductor system 400. Input device 405 may be implemented by a pointing device such as a touch pad or a computer mouse, a keypad, or a keyboard, for example.

Figure 9:
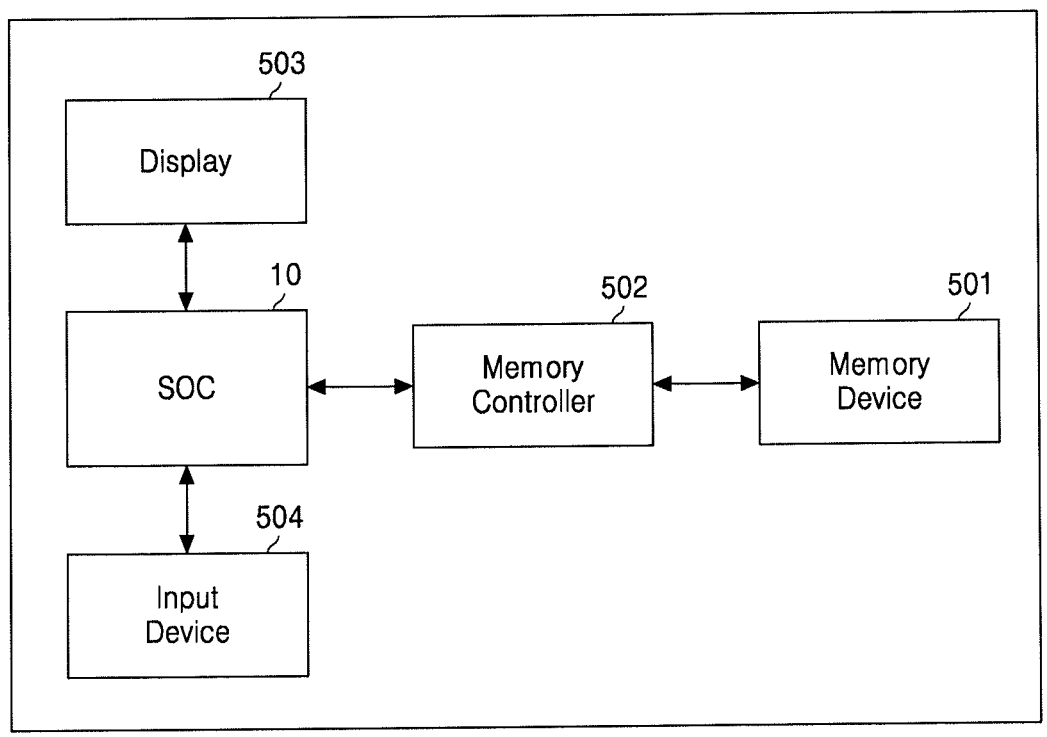
FIG. 9 is a block diagram of a computer system including the SoC illustrated in FIG. 1 in accordance with principles of inventive concepts.

FIG. 9 is a block diagram of an exemplary embodiment of a computer system including SoC illustrated in FIG. 1 according to exemplary embodiments in accordance with principles of inventive concepts.

Computer system 500 may be implemented as a personal computer (PC), a network server, a tablet PC, a net-book, an e-reader, a personal digital assistant (PDA), a portable multimedia player (PMP), an MP3 player, or an MP4 player, for example.

Computer system 500 includes SoC 10, memory device 501, memory controller 502 controlling the data processing operations of memory device 501, display 503 and input device 504.

SoC 10 may display data stored in memory device 501 through display 503 according to data input through input device 504. Input device 504 may be implemented by a pointing device such as a touch pad or a computer mouse, a keypad, or a keyboard. SoC 10 may control the overall operation of computer system 500 and the operations of memory controller 502.

Memory controller 502, which may control the operations of memory device 501, may be implemented as a part of SoC 10 or as a separate chip, for example.

Figure 10:
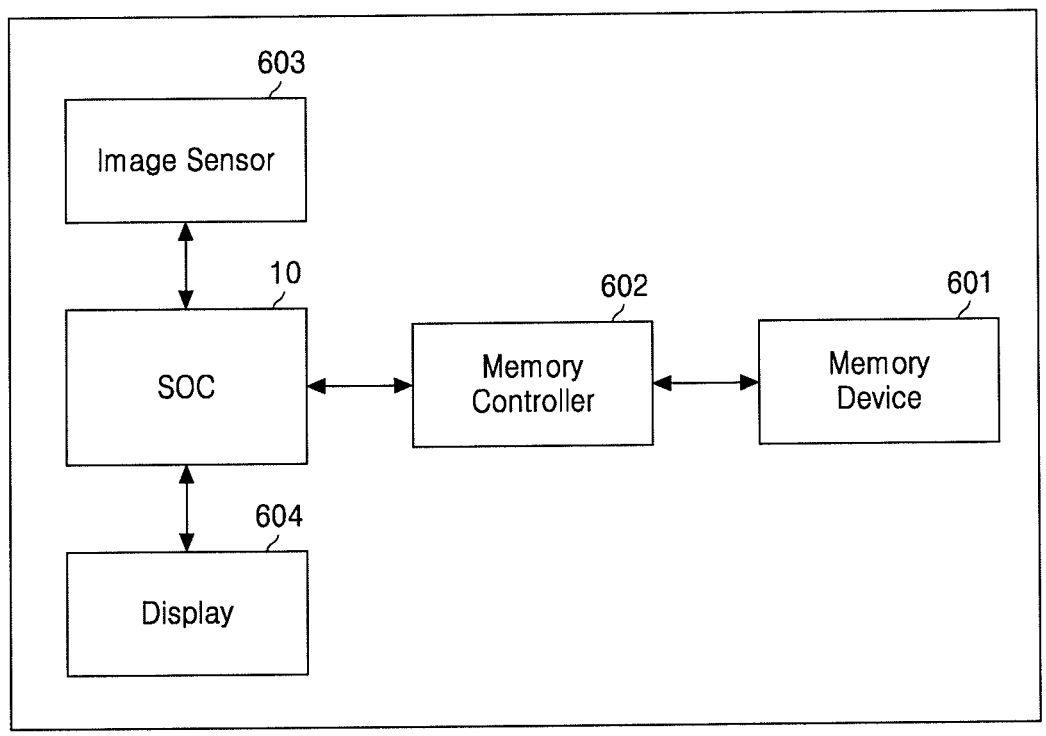
FIG. 10 is a block diagram of a computer system including the SoC illustrated in FIG. 1 in accordance with principles of inventive concepts.

FIG. 10 is a block diagram of an exemplary embodiment of a computer system including the SoC illustrated in FIG. 1 in accordance with principles of inventive concepts.

Computer system 600 may be implemented as an image processing device, such as a digital camera, a cellular phone equipped with a digital camera, a smart phone equipped with a digital camera, or a tablet PC equipped with a digital camera, for example.

Computer system 600 includes SoC 10, memory device 601, and memory controller 602 controlling data processing operations, such as a write operation and a read operation, of memory device 601. Computer system 600 further includes image sensor 603 and display 604.

Image sensor 603 included in computer system 600 converts optical images into digital signals and outputs the digital signals to SoC 10 or memory controller 602. The digital signals may be controlled by SoC 10 to be displayed through display 604 or stored in memory device 601 through memory controller 602, for example.

Data stored in memory device 601 may be displayed through display 604 according to the control of SoC 10 or memory controller 602. Memory controller 602, which may control the operations of memory device 601, may be implemented as a part of SoC 10 or as a separate chip.

Figure 11:
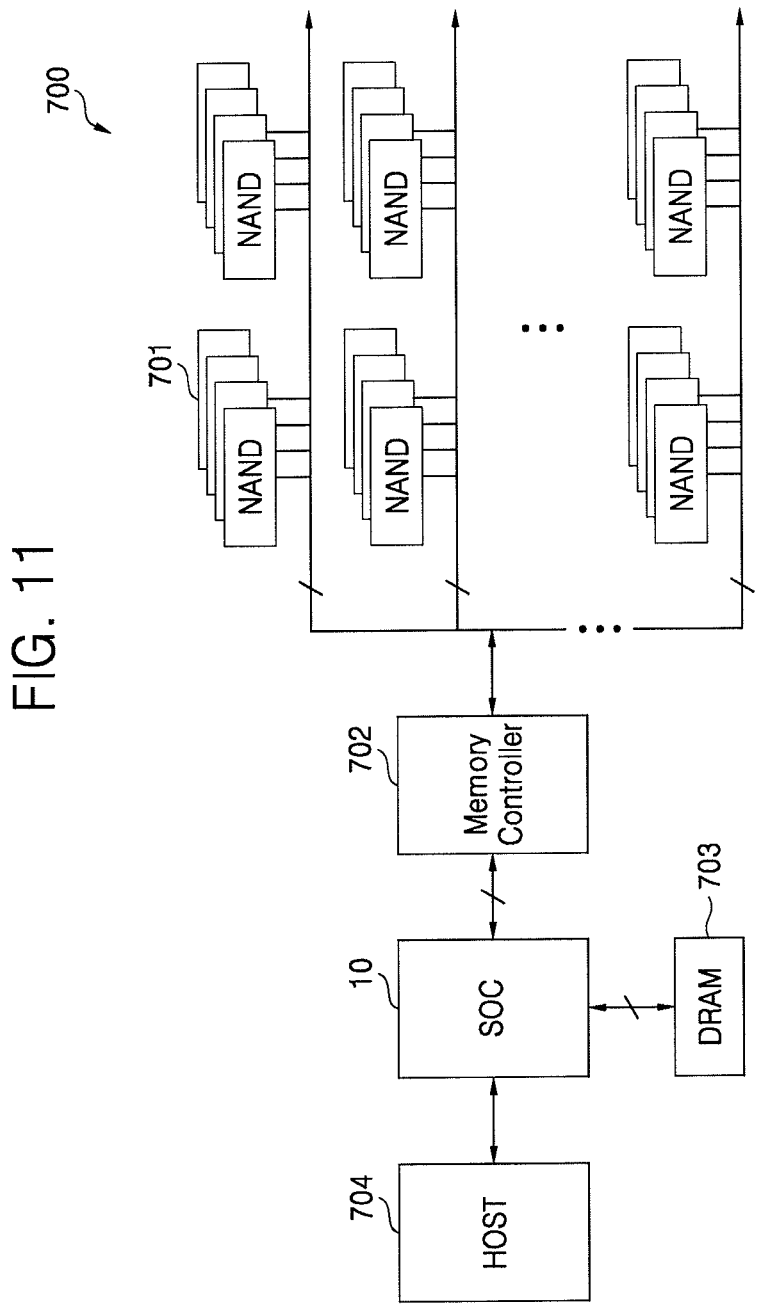
FIG. 11 is a block diagram of a memory system including the SoC illustrated in FIG. 1 in accordance with principles of inventive concepts.

FIG. 11 is a block diagram of an exemplary embodiment of a memory system including SoC illustrated in FIG. 1 in accordance with principles of inventive concepts. Memory system 700 may be implemented as a data storage system like a solid state drive (SSD).

Memory system 700 includes memory devices 701, memory controller 702 controlling the data processing operations of memory devices 701, volatile memory device 703 like a dynamic random access memory (DRAM), and SoC 10 controlling data transferred between memory controller 702 and a host 704 to be stored in volatile memory device 703.

The inventive concepts may also be embodied as computer-readable codes on a computer-readable recording medium, for example. A computer-readable recording medium is any data storage device that can store data as a program which can be thereafter read by a computer system. Examples of computer-readable recording medium include read-only memory (ROM), random-access memory (RAM), CD-ROMs, magnetic tapes, floppy disks, and optical data storage devices.

The computer-readable recording medium can also be distributed over network coupled computer systems so that the computer-readable code is stored and executed in a distributed fashion. Also, functional programs, codes, and code segments to accomplish the present general inventive concept can be easily construed by programmers.

In an asynchronous bridge, a method of operating the asynchronous bridges, and a SoC including the asynchronous bridges in accordance with principles of inventive concepts, a critical path may be prevented from occurring by using a multi-cycle path. Accordingly, it is possible to perform a timing closing and prevent a negative slack from occurring.

While exemplary embodiments in accordance with principles of inventive concepts have been shown, it will be understood that various changes in form and details may be made therein without departing from the spirit and scope of the following claims.

What is claimed is:

1. An asynchronous bridge comprising:
    a transmission unit to receive a write valid signal and input data from a master circuit, output write addresses incremented under control of the write valid signal, sequentially store the input data in at least two memory groups each including memory cells, the sequential storage interleaved among the at least two memory groups as directed by write addresses, and then sequentially output the stored input data, as directed by read addresses, wherein the transmission unit comprises:
        a write address controller to increment write addresses, in response to the write valid signal received from the master circuit, and output incremented write addresses;
        a first selector to selectively output the input data, based on the output write addresses;
        and at least two selectors to selectively output the stored input data, based on the read addresses, the at least two selectors corresponding to the at least two memory groups, respectively,
        wherein the at least two memory groups for sequentially storing the input data receive from the first selector in the memory cells; and
    a receiving unit to receive a read ready signal from a slave circuit, determine whether memory cells are valid, based on the write addresses and the read addresses, and then output a read valid signal and the input data, based on the determination, wherein the transmission unit includes a first domain transformation unit to stabilize signals received from the receiving unit having a clock domain different from the transmission unit and the receiving unit includes a second domain transformation unit to stabilize signals received from the transmission unit,
    wherein the data stored in the memory cells corresponding to the at least two memory groups are sequentially output to the receiving unit in interleaving manner through at least two channels corresponding to the at least two memory groups, wherein the receiving unit comprises:
        a global read address controller to increment global read addresses to select one of the at least two memory groups, responsive to the read ready signal received from the slave circuit and the read valid signal, and sequentially output incremented global read addresses;
        a determination unit to compare the write addresses with the global read addresses, determine whether the at least two memory groups are valid, based on a result of the comparison, and then output a result of the determination; and
        a local read address controller to output local read addresses to sequentially select memory cells included in the selected memory group, based on a read ready signal corresponding to the selected memory group and the result of determining whether the at least two memory groups are valid.

2. The asynchronous bridge of claim 1, wherein, if the determining of whether the at least two memory groups reveals that at least one memory group is valid from among the at least two memory groups, then the determination unit is configured to simultaneously output a read valid signal indicating this fact and to output data stored in memory cells corresponding to the at least one memory group to the slave circuit and the global read address controller, and
    if the determining of whether the at least two memory groups reveals that that all the at least two memory groups are invalid, then the determination unit is configured to output a read valid signal indicating this fact to the slave circuit and the global read address controller.

3. The asynchronous bridge of claim 2, wherein the determination unit comprises:
    a determination logic unit to determine whether data stored in memory cells included in a memory group corresponding to the write addresses and the global read addresses, based on the write addresses and the global read addresses, and outputting a result of the determining; and
    a latch unit to latch an output signal of the determination logic unit and to output the latched signal as the read valid signal.

4. The asynchronous bridge of claim 3, wherein the latch unit comprises at least one flip-flop, and
    if a number of the at least two memory groups is k, a number of the at least one flip-flop is (k−1), wherein k denotes an integer that is equal to or greater than '2'.

5. The asynchronous bridge of claim 1, wherein the local read address controller comprises:
    an arithmetic logic unit to compare each of read ready signals respectively corresponding to the at least two memory groups with the read valid signal, and to output a result of the comparing; and
    a first flip-flop to output an input value for only a predetermined output value received from the arithmetic logic unit.

6. A method of operating an asynchronous bridge including at least two memory groups, the method comprising:
    receiving a write valid signal and input data from a master circuit;
    outputting write addresses incremented in response to the write valid signal, and sequentially storing the input data in memory cells included in the at least two memory groups, based on the write addresses; and
    determining whether the at least two memory groups are valid, based on the write addresses and global read addresses, wherein write addresses direct data to be written interleaved among the at least two memory groups,
    wherein the data stored in the memory cells corresponding to the at least two memory groups are sequentially output in interleaving manner through at least two channels corresponding to the at least two memory groups.

7. The method of claim 6, after the determining of whether the at least two memory groups are valid, further comprising:

if it is determined that at least one memory group from among the at least two memory groups is valid, simultaneously outputting a read valid signal indicating this fact and outputting data stored in memory cells corresponding to the at least one memory group; and if it is determined that all the at least two memory groups are invalid, outputting a read valid signal indicating this fact.

8. A non-transitory recording medium for recording a program for executing the method of claim 6.

9. A system on chip (SoC) comprising:
a master circuit;
a slave circuit; and
an asynchronous bridge comprising:
a transmission unit to receive a write valid signal and input data from a master circuit, output write addresses incremented under control of the write valid signal, sequentially store the input data in at least two memory groups each including memory cells, the sequential storage interleaved among the at least two memory groups as directed by write addresses, and then sequentially output the stored input data, as directed by read addresses, wherein the transmission unit comprises:
a write address controller to increment write addresses, in response to the write valid signal received from the master circuit, and output incremented write addresses;
a first selector to selectively output the input data, based on the output write addresses;
and at least two selectors to selectively output the stored input data, based on the read addresses, the at least two selectors corresponding to the at least two memory groups, respectively,
wherein the at least two memory groups for sequentially storing the input, data receive from the first selector in the memory cells; and
a receiving unit to receive a read ready signal from a slave circuit, determine whether memory cells are valid, based on the write addresses and the read addresses, and then output a read valid signal and the input data, based on the determination, wherein the transmission unit includes a first domain transformation unit to stabilize signals received from the receiving unit having a clock domain different from the transmission unit and the receiving unit includes a second domain transformation unit to stabilize signals received from the transmission unit,
wherein the data stored in the memory cells corresponding to the at least two memory groups are sequentially output to the receiving unit in interleaving manner through at least two channels corresponding to the at least two memory groups wherein the receiving unit comprises:
a global read address controller to increment global read addresses to select one of the at least two memory groups, responsive to the read ready signal received from the slave circuit and the read valid signal, and sequentially output incremented global read addresses;
a determination unit to compare the write addresses with the global read addresses, determine whether the at least two memory groups are valid, based on a result of the comparison, and then output a result of the determination; and
a local read address controller to output local read addresses to sequentially select memory cells included in the selected memory group, based on a read ready signal corresponding to the selected memory group and the result of determining whether the at least two memory groups are valid.

10. The SoC of claim 9, wherein, if the determining of whether the at least two memory groups reveals that at least one memory group is valid from among the at least two memory groups, then the determination unit is configured to simultaneously output a read valid signal indicating this fact and to output data stored in memory cells corresponding to the at least one memory group to the slave circuit and the global read address controller, and if the determining of whether the at least two memory groups reveals that that all the at least two memory groups are invalid, then the determination unit is configured to output a read valid signal indicating this fact to the slave circuit and the global read address controller.

\* \* \* \* \*